(12) United States Patent
Hiltunen et al.

(10) Patent No.: US 12,497,356 B2
(45) Date of Patent: Dec. 16, 2025

(54) STABLE FORMULATION OF ARYLSULFONYLPROPENENITRILES

(71) Applicant: KEMIRA OYJ, Helsinki (FI)

(72) Inventors: Jaakko Hiltunen, Kauniainen (FI); Nina Sneitz, Helsinki (FI); Petteri Suominen, Espoo (FI)

(73) Assignee: KEMIRA OYJ, Helsinki (FI)

( * ) Notice: Subject to any disclaimer, the term of this patent is extended or adjusted under 35 U.S.C. 154(b) by 364 days.

(21) Appl. No.: 17/607,153

(22) PCT Filed: Apr. 29, 2020

(86) PCT No.: PCT/FI2020/050279
§ 371 (c)(1),
(2) Date: Oct. 28, 2021

(87) PCT Pub. No.: WO2020/221960
PCT Pub. Date: Nov. 5, 2020

(65) Prior Publication Data
US 2022/0213033 A1 Jul. 7, 2022

(30) Foreign Application Priority Data
Apr. 29, 2019 (FI) .................. 20195344

(51) Int. Cl.
*C07C 317/44* (2006.01)
*A61K 47/20* (2006.01)

(52) U.S. Cl.
CPC .......... *C07C 317/44* (2013.01); *A61K 47/20* (2013.01)

(58) Field of Classification Search
CPC .............. C07C 317/44; A61K 47/20
See application file for complete search history.

(56) References Cited

U.S. PATENT DOCUMENTS

| | | | |
|---|---|---|---|
| 3,159,532 A | 12/1964 | Heininger et al. | |
| 3,159,666 A | 12/1964 | Heininger et al. | |
| 3,541,119 A | 11/1970 | Richter et al. | |
| 3,976,668 A | 8/1976 | Richter | |
| 4,049,695 A | 9/1977 | Burk et al. | |
| 4,331,480 A | 5/1982 | Gutman et al. | |
| 4,617,328 A | 10/1986 | Liu | |
| 2009/0203632 A1* | 8/2009 | Avelar ............... | A61K 47/34 514/249 |

FOREIGN PATENT DOCUMENTS

| | | |
|---|---|---|
| CN | 109411815 | 1/2019 |
| GB | 1182151 | 2/1970 |
| JP | 2011231045 | 11/2011 |
| WO | 2019042985 | 3/2019 |
| WO | 2019043289 | 3/2019 |

OTHER PUBLICATIONS

Invivogen product information and MSDS "BAY11-7082", 2012, [retrieved on Oct. 28, 2021}. Retrieved from <www.invivogen.com>.

Aaltonen, T. Synthesis and Scale-Up of Arylsulfonylpropenenitriles—Master's Thesis. [online], Jul. 7, 2017, [retrieved on Oct. 28, 2021]. Retrieved from <http://urn.fi/URN:NBN:fi:aalto-201709046825>.

* cited by examiner

*Primary Examiner* — Adam C Milligan
*Assistant Examiner* — Karen Cheng
(74) *Attorney, Agent, or Firm* — Robin L. Teskin; Baker, Donelson, Bearman, Caldwell & Berkowitz PC

(57) ABSTRACT

The present invention relates to a stable formulation comprising at least one organic solvent selected from a group consisting of aliphatic esters and cyclic esters, and a compound of Formula (I).

23 Claims, 2 Drawing Sheets

STABLE FORMULATION OF ARYLSULFONYLPROPENENITRILES

RELATED APPLICATIONS

This application is a U.S. National Phase application of Int'l Appl. No. PCT/FI2020/050279, filed Apr. 29, 2020, which claims priority to Finnish Appl. No. 20195344, filed Apr. 29, 2019, each of which are incorporated herein by reference in their entireties.

The present invention relates to a stable formulation comprising a compound of Formula (I) and to a use of an organic solvent according to preambles of the enclosed independent claims. Especially the present invention relates to a formulation comprising an arylsulfonylpropenenitrile that is stable on storage. The formulation enables the transportation and long-time storage of the compound at ambient temperature.

Compounds incorporating a vinylarenesulfonyl moiety have been found to be biologically interesting as a means to combat *Staphylococcus aureus* by inhibition of a sortase SrtA isoform, just to name one example. Synthetically vinylarenesulfonyls are interesting due to their capability to act as Michael acceptors and due to their utility in a variety of cycloaddition reactions.

In order to make it possible to further explore the usefulness of the arylsulfonylpropenenitriles in many fields of application there is a need for a simple and cost-effective yet environmentally benign formulation to enable the long-time storage of the compound. Conventionally, when storing an arylsulfonylpropenenitrile compound as a solid, the instability of the compound requires that the long-time storage is done at temperatures below room temperature, in many cases in sub-freezing temperature.

The applicant has recently submitted applications disclosing several uses arylsulfonylpropenenitriles as biocides further adding to the interest in stable and transportable formulations of these compounds.

In addition to the solubility of a compound in a solvent, many other factors also affect the choice of solvent when producing a formulation of the compound. In order to adhere to the principles of sustainable chemistry and manufacturing, factors such as volatility, toxicity, and carbon footprint of both the solvent and the formulation must be considered. Depending on the application, further limitation may be imposed by factors such as legislation and regulatory limitations. In practice, this means that formulations with different compositions may be required for different applications.

An object of this invention is to minimise or possibly even eliminate the disadvantages existing in the prior art.

Another object of the present invention is to provide a stable formulation comprising a compound of Formula (I) suitable for long time storage, preferably at ambient temperature.

An object of the present invention is to provide a stable formulation which is suitable for use in various industrial processes.

These objects are attained with the invention having the characteristics presented below in the characterising parts of the independent claims. Some preferred embodiments of the invention are presented in the dependent claims.

The embodiments mentioned in this text relate, where applicable, to all aspects of the invention, even if this is not always separately mentioned.

A typical formulation according to the present invention comprises at least one organic solvent selected from a group consisting of aliphatic esters and cyclic esters, and a compound according to Formula (I)

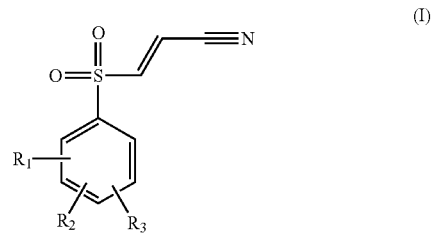

where $R_1$, $R_2$, and $R_3$ independently represent a hydrogen atom; a halogen atom; a hydroxy group; an amino group; an alkylamino group; an alkyl group; a hydroxyalkyl group; a haloalkyl group or an alkoxy group having 1 to 4 carbon atoms; or an acylamido group having 1 to 10 carbon atoms, and a solvent. The groups $R_1$, $R_2$, and $R_3$ of the compound can be varied according to the desired use of said formulation.

A typical use according to the present invention of an aliphatic ester or cyclic ester is as an organic solvent in a formulation comprising a compound of Formula (I), in which $R_1$, $R_2$, and $R_3$ independently represent a hydrogen atom; a halogen atom; a hydroxy group; an amino group; an alkylamino group; an alkyl group; a hydroxyalkyl group; a haloalkyl group or an alkoxy group having 1 to 4 carbon atoms; or an acylamido group having 1 to 10 carbon atoms, for improving the stability of the compound.

According to the present invention, it was surprisingly found that the storage stability of the compound of Formula (I), i.e. an arylsulfonylpropenenitrile compound, can be significantly increased by making a formulation comprising the said compound and at least one organic solvent selected from aliphatic and cyclic esters. In this formulation, the arylsulfonylpropenenitrile compound can be stored for prolonged times without changes in the concentration of arylsulfonylpropenenitrile in the formulation. The formulation comprising an arylsulfonylpropenenitrile has an improved stability compared to dry storage of said arylsulfonylpropenenitrile. For example, at least 90% of an original amount of arylsulfonylpropenenitrile compound in the formulation remains in the formulation after the formulation has been stored for 6 months at 25° C.

As used herein, the term "stability" refers to the stability of the arylsulfonylpropenenitrile compound, i.e. compound of Formula (I). Decrease in stability in the context of the present application may refer both to the degradation of the arylsulfonylpropenenitrile and the reaction of the arylsulfonylpropenenitrile with another substance to form a new moiety. A non-limiting example of a reaction wherein the arylsulfonylpropenenitrile compound forms a new moiety is the homopolymerization of arylsulfonylpropenenitrile.

In the present context, expressions "compound of Formula (I)", "arylsulfonylpropenenitrile compound" and "arylsulfonylpropenenitrile" are used as synonyms. These expressions are fully interchangeable in the present text.

As used herein, the term "formulation" is used to describe a mixture comprising an active ingredient, i.e. compound of Formula (I) and at least one organic solvent selected from aliphatic and cyclic esters. Depending on the intended use of the arylsulfonylpropenenitrile, the formulation may be in one of several different physical forms such as a solution, an emulsion, a gel, a suspension, a dispersion, or an aerosol. Preferably the formulation is in form of a solution.

According to one preferable embodiment the compound of Formula (I) is dissolved in the organic solvent. Preferably the compound is fully dissolved in the organic solvent, which means that the formulation is free from solid particles of the compound of Formula (I). Furthermore, the compound is preferably fully dispersed in the formulation, which means that the concentration of the compound is uniform throughout the formulation.

In one embodiment of the present invention, the formulation comprises an arylsulfonylpropenenitrile according to general Formula (I) and a solvent.

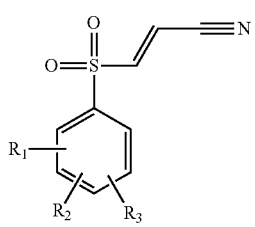

(I)

In one embodiment of the invention, $R_1$, $R_2$, and $R_3$ in Formula (I) independently represent a hydrogen atom; a halogen atom; a hydroxy group; an amino group; an alkylamino group having 1 to 4 carbon atoms; an alkyl group having 1 to 4 carbon atoms; a hydroxyalkyl group having 1 to 4 carbon atoms; a haloalkyl group having 1 to 4 carbon atoms, or an alkoxy group having 1 to 4 carbon atoms; or an acylamido group having 1 to 10 carbon atoms.

In another embodiment of the invention, $R_1$ represents a methyl group; an ethyl group, a propyl group; a butyl group; a methoxy group; an ethoxy group; a propoxy group; an isopropoxy group; a n-butoxy group; or a tertiary butoxy group; and $R_2$ and $R_3$ represent independently a hydrogen atom; a methyl group; an ethyl group, a propyl group; a butyl group; a methoxy group; an ethoxy group; a propoxy group; an isopropoxy group; a n-butoxy group; a tertiary butoxy group.

In one embodiment of this invention the formulation comprises a compound of Formula (I) where $R_1$ represents a methyl group in the 4-position and $R_2$ and $R_3$ both represent hydrogen. The compound is thus as presented in Formula (II).

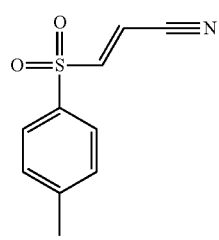

(II)

According to one embodiment of the invention the compound of Formula (I) is (E)-3-tosylacrylonitrile.

According to one embodiment of the present invention, the formulation may comprise the compound of Formula (I) in a range from 0.2-20 weight-%, preferably 0.5-15 weight-%, more preferably 0.8-10 weight-%, even more preferably 1-7 weight-%, sometimes even 1-5 weight-%, 1.2-5 weight-%, 1.4-4 weight-%, or 1.5-3 weight-% or 2-4 weight-%, calculated from the total weight of the compound and organic solvent. According to one embodiment the formulation may comprise at least 0.2 weight-% or more, preferably more than 0.5 weight-%, more preferably more than 0.8 weight-%, even more preferably more than 1 weight-%, sometimes even more than 1.2 weight-%, more than 1.4 weight-%, or more than 1.5 weight-%, of the compound of Formula (I), calculated from the total weight of the compound and organic solvent. The formulation may comprise less than 20 weight-%, preferably less than 15 weight-%, more preferably less than 10 weight-%, even more preferably less than 7 weight-%, sometimes even less than 5 weight-%, less than 4 weight-%, or less than 3 weight-%, of the compound of Formula (I), calculated from the total weight of the compound and organic solvent.

In one specific embodiment of the present invention, the formulation comprises 2 weight-% or at least 2 weight-% arylsulfonylpropenenitrile dissolved in the organic solvent, calculated from the total weight of the compound and organic solvent. In one embodiment of the present invention, the formulation comprises 2 weight-% or at least 2 weight-% (E)-3-tosylacrylonitrile dissolved in the organic solvent, calculated from the total weight of the compound and organic solvent.

The formulation according to present invention comprises at least one organic solvent selected from aliphatic esters and cyclic esters. The formulation may comprise at least 80 weight-%, preferably at least 90 weight-%, more preferably at least 95 weight-%, of the organic solvent selected from a group consisting of aliphatic esters and cyclic esters, calculated from the total weight of compound of Formula (I) and organic solvent.

According to one embodiment the formulation comprises at least one organic solvent selected from aliphatic esters and cyclic esters in a range of 80-99.9 weight-%, more preferably 90-99.9 weight-%, even more preferably 95-99.5 weight-%, calculated from the total weight of compound of Formula (I) and organic solvent. It is possible that the formulation comprises at least one organic solvent selected from aliphatic esters and cyclic esters in a range of 80-99.8 weight-%, or 85-99.5 weight-%, or 90-99.2 weight-%, or 93-99 weight-%, or 95-98.8 weight-%, 96-98.6 weight-%, or 97-98.5 weight-%, or even 96-98 weight-%, calculated from the total weight of compound of Formula (I) and organic solvent.

The organic solvent may be an aliphatic ester, which is a linear or branched monoester, diester or triester. The aliphatic ester may be selected, for example, from the group containing acetates, propionates, butyrates, formates, or mixtures thereof. In one embodiment the ester is an alkyl ester. In a specific embodiment of the present invention, the ester is a methyl ester, an ethyl ester, a propyl ester, a butyl ester, or a mixture thereof. According to one embodiment the aliphatic ester is a monoester, diester or triester of glycerol and C1-C5 acid. According to another embodiment the aliphatic ester is a monoester, diester or triester of citric acid and C1-C5 alcohol.

According to one preferable embodiment the organic solvent may be a cyclic ester, which is selected from propylene carbonate, ethylene carbonate, and trimethylene carbonate, preferably propylene carbonate.

In one embodiment of the present invention, the formulation comprises 2 weight-% or at least 2 weight-% arylsulfonylpropenenitrile dissolved in propylene carbonate, calculated from the total weight of arylsulfonylpropenenitrile and the organic solvent.

In one embodiment of the present invention, the formulation comprises 2 weight-% or at least 2 weight-% (E)-3-tosylacrylonitrile dissolved in propylene carbonate, calculated from the total weight of (E)-3-tosylacrylonitrile and the organic solvent.

In one embodiment of the present invention, the formulation may comprise a mixture of two or more organic solvents, which are selected from aliphatic and cyclic esters.

In one embodiment of the present invention, the formulation comprises an organic solvent selected from aliphatic and cyclic ester, which is a water-miscible solvent.

In addition to the composition of Formula (I) and at least one organic solvent selected from aliphatic and cyclic esters the formulation may further comprise water. The formulation may comprise water in a range of 0.1 to 90 weight-%, preferably 0.5-50 weight-%, more preferably 1-20 weight-%, even more preferably 2-10 weight-%, calculated from the total weight of the compound of Formula (I), organic solvent and water.

In one embodiment of the present invention, the formulation comprises water in an amount that is 0.1% (V/V) to 90% (V/V).

In yet another embodiment of this invention, the amount of water contained in the formulation is less than 90% (V/V), less than 80% (V/V), less than 70% (V/V), less than 60% (V/V), less than 50% (V/V), less than 20% (V/V), less than 15% (V/V), less than 10% (V/V), less than 5% (V/V), less than 2% (V/V), less than 1% (V/V), less than 0.5% (V/V), less than 0.2% (V/V), less than 0.1% (V/V) or 0% (V/V).

In still another embodiment of this invention, the amount of water contained in the formulation is more than 90% (V/V), more than 80% (V/V), more than 70% (V/V), more than 60% (VN), more than 50% (V/V), more than 20% (V/V), more than 15% (V/V), more than 10% (V/V), more than 5% (V/V), more than 2% (V/V), more than 1% (V/V), more than 0.5% (V/V), more than 0.2% (V/V), or more than 0.1% (V/V).

According to one embodiment of the invention the formulation may further comprise an additional organic solvent, preferably an alcohol. In case the formulation comprises one or more additional solvents, a total amount of organic solvents in the formulation may be in a range of 80-99.9 weight-%, more preferably 90-99.9 weight-%, even more preferably 95-99.5 weight-% or 90-96 weight-%, calculated from the total weight of the compound of Formula (I) and the organic solvents. It is possible that the total amount of organic solvents in the formulation may be in a range of 80-99.8 weight-%, or 85-99.5 weight-%, or 90-99.2 weight-%, or 93-99 weight-%, or 95-98.8 weight-%, 96-98.6 weight-%, or 97-98.5 weight-%, or even 96-98 weight-%, compound of Formula (I) and the organic solvents. The total amount of organic solvents includes all organic solvents present in the formulation, including the aliphatic and/or cyclic esters as well as all additional solvents.

In one embodiment of the present invention, the formulation comprises an additional organic solvent selected from the group containing nitriles, alcohols, ketones, deep eutectic solvents, ionic liquids, and mixtures thereof. In a specific embodiment of the present invention, the formulation comprises as an additional organic solvent a nitrile selected from the group containing acetonitrile and propionitrile, an alcohol selected from the group containing methanol, ethanol, n-butanol, sec-butanol, tert-butanol, n-propanol, isopropanol, and 2-ethylhexanol, a diol selected from the group containing ethylene glycol and propylene glycol, a ketone selected from the group containing acetone and methylethylketone, or any mixture thereof.

As a non-limiting example, choline acetate may be used be used as the organic solvent in a formulation according to the present invention.

In one embodiment of the present invention, the additional organic solvent is selected from the group containing ethers. In one embodiment, the ether is selected from the group containing linear ethers, cyclic ethers, or mixtures thereof. In one embodiment of the present invention, the ether is selected from the group containing diethyl ether dimethyl ether, tetrahydrofuran, dioxane, tert-amyl methyl ether, methyl t-butyl ether (MTBE), and mixtures thereof.

In one embodiment of the present invention the formulation comprises an additional organic solvent selected from the group containing N,N-dimethyl formamide (DMF) and dimethylsulfoxide (DMSO).

In one embodiment of the present invention, the additional organic solvent is an alcohol selected from the group containing sec-butanol, tert-butanol, isopropanol, and mixtures thereof.

In one embodiment of the present invention, the formulation comprises an alcohol as an additional organic solvent and a cyclic ester as an organic solvent. In one embodiment of the present invention, the formulation comprises a secondary or tertiary alcohol selected from the group containing sec-butanol, tert-butanol, isopropanol, and mixtures thereof, and a carbonate selected from the group containing propylene carbonate, ethylene carbonate, trimethylene carbonate, and mixtures thereof.

In one embodiment of the present invention, the formulation comprises an additional organic solvent and the organic solvent selected from aliphatic and cyclic esters in a ratio of alcohol to ester from 20:1 to 1:20, from 15:1 to 1:15, from 10:1 to 1:10, from 5:1 to 1:5, from 3:1 to 1:3, from 2:1 to 1:3, or 1:1. Preferably the ester is propylene carbonate.

According to one embodiment of the invention the formulation is free of any additional solvents and it consists only of organic solvents selected from aliphatic and cyclic esters.

In one embodiment of the present invention, the formulation may further comprise one or more additives or adjuncts in an amount of up to 5 weight-%, calculated from the total weight of the formulation, to modify the properties of the formulation. In specific embodiments of the present invention, the formulation comprises may comprise an additive which is an emulsifier, a gelling agent, a thickener, a solubilizer, or a mixture thereof.

In one embodiment of the present invention, the formulation may further comprise an additive or an adjunct, which is a surfactant. The function of the surfactant may be e.g. act as an emulsifier, or if the formulation comprises water, as a phase-transfer agent to aid in the transfer of the arylsulfonylpropenenitrile from an organic phase to an aqueous phase. In a specific embodiment of the present invention, the surfactant is selected from the group containing polysorbate, such as Tween™, dodecylguanidine, dodecylbiguanidine, sodium dodecylsulfate, lauryl sulphate, poly(ethylene glycol) derivatives, such as Triton™ X, sodium stearate, ammonium dodecylsulfate, ammonium stearate, or a mixture thereof.

In one embodiment of the present invention, the formulation comprises an additive which is a solubilizer, which is selected from the group containing alkaline and alkaline earth metal salts of carboxylic acids. Non-limiting examples of compounds suitable as a solubilizer include sodium formate, sodium acetate, sodium propionate, potassium formate, potassium acetate, potassium propionate, or a mixture thereof.

In one embodiment of the present invention, the formulation comprises one or more stabilizing agents that further improve the stability of the arylsulfonylpropenenitrile compound on storage. In a specific embodiment of the present invention, the formulation comprises an antioxidant to prevent oxidation of the arylsulfonylpropenenitrile compound on prolonged storage of the formulation.

According to one embodiment the formulation may comprise a residual amount of divalent metal ions, such as $Cu^{2+}$, typically in amount of 10-100 ppm or 15-80 ppm. The divalent metals typically originate from used polymerization catalysts. It has been observed that the present formulation is unexpectedly stable, even if residual amounts of divalent ions might be present.

As used herein, all percentages are indicated as masspercent of the total mass of the formulation unless indicated otherwise.

In one embodiment of the present invention, the formulation may initially be prepared with a higher concentration of arylsulfonylpropenenitrile which is diluted to a desired concentration before use. As is understood by a person skilled in the art, the upper limit of the concentration of arylsulfonylpropenenitrile in the formulation will be limited by e.g. the solubility of the arylsulfonylpropenenitrile in the solvent or medium used. Depending on the desired form of the formulation, the concentrate may be diluted with a suitable solvent and/or reformulated by the addition of a suitable additive substance. As a non-limiting example, a concentrated liquid formulation may be reformulated as a gel through the addition of a suitable gelling agent.

In one embodiment of the present invention, the stability of the formulation may be further improved by refrigerating the formulation to temperatures below ambient temperature. Preferably the formulation is stable at ambient temperature at 25° C.

In one embodiment of the present invention, inert gas may be added to a container holding a formulation comprising an arylsulfonylpropenenitrile to further improve the stability of the arylsulfonylpropenenitrile on storage.

Another aspect of the present invention is a method for preparing a formulation comprising an arylsulfonylpropenenitrile and a solvent selected from aliphatic and cyclic esters. In one embodiment of the present invention, the formulation can be produced by dissolving the arylsulfonylpropenenitrile in a suitable organic solvent selected from aliphatic and cyclic esters in an amount that produces the desired concentration. In another embodiment of the present invention, a concentrated liquid formulation is first prepared by dissolving the arylsulfonylpropenenitrile in a suitable organic solvent selected from aliphatic and cyclic esters followed by dilution to the desired concentration and/or addition of additives.

Yet another aspect of the present invention is the use of the formulation according to the present invention comprising an arylsulfonylpropenenitrile and a solvent as a biocidal agent. A formulation according to the present invention comprising an arylsulfonylpropenenitrile may be used as a biocide in many applications, such as in pulp and paper, and petroleum applications. As will be readily seen by a person skilled in the art, the exact composition of the formulation may need to be adjusted according to limitations imposed either by practical considerations of compatibility with the intended application or e.g. by limitations imposed by regulatory organizations.

EXPERIMENTAL SECTION

Some embodiments of the invention are described below with the help of examples. The examples are given only for illustrative purpose and they do not limit the scope of the invention.

EXAMPLE 1

Preparation of Formulation (E)-3-tosylacrylonitrile was dissolved by adding the solid material (20 g) in one portion to the solvent (1 l, propylene carbonate) and stirring until all solids have dissolved.

EXAMPLE 2

Stability with Different Solvents

The stability of (E)-3-tosylacrylonitrile in different solvents, concentrations and temperatures was studied. The initial tests were conducted at room temperature and the tested solvents were i) propylene carbonate; ii) ethanol; iii) dimethylsulfoxide (DMSO); iv) combination of 35% ethanol-65% propylene glycol; v) water at pH 4; and water at pH 8.

The amount of (E)-3-tosylacrylonitrile was analysed with HPLC-DAD. For sample pre-treatment, an approximately 1.45 mg/ml solution of (E)-3-tosylacrylonitrile was prepared in acetonitrile and the solution was analysed by HPLC. Quantification was performed using external (ESTD) calibration with authentic standards.

Figure 1:
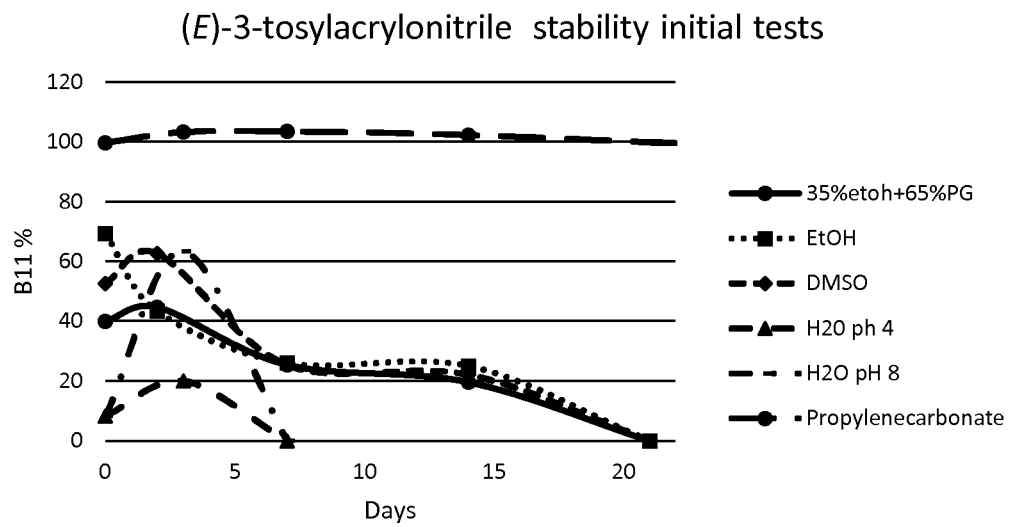
FIG. 1 presents the short-term stability of an arylsulfonylpropenenitrile in various solvents.

Results from the initial tests with propylene carbonate, ethanol, dimethylsulfoxide, 35% ethanol-65% propylene glycol, and water are presented in FIG. 1.

As seen from the results, in most cases (E)-3-tosylacrylonitrile did not dissolve thoroughly in the tested solvent or dissolving continued for several days. Propylene carbonate was the only tested solvent in which (E)-3-tosylacrylonitrile dissolved immediately and was stable for at least one month.

Figure 2:
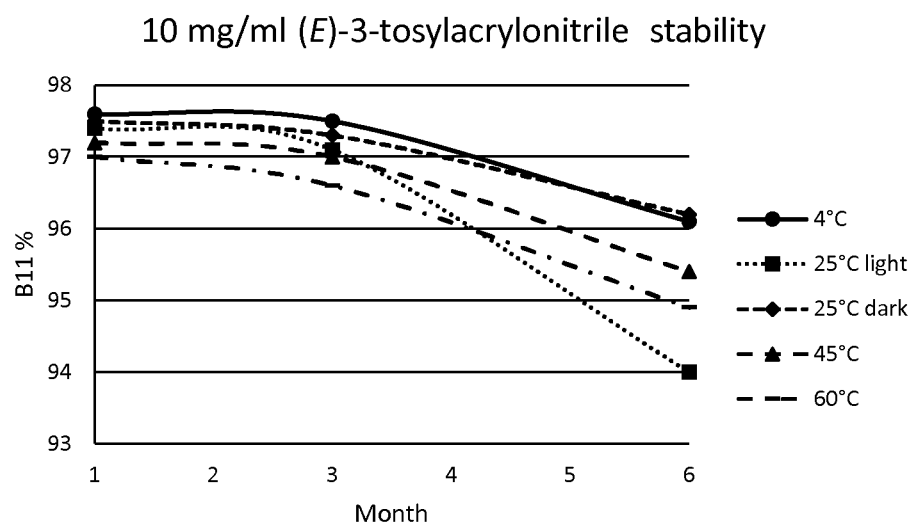
FIG. 2 presents the long-time stability of a solution of 10 mg/ml arylsulfonylpropenenitrile in propylene carbonate.
Figure 3:
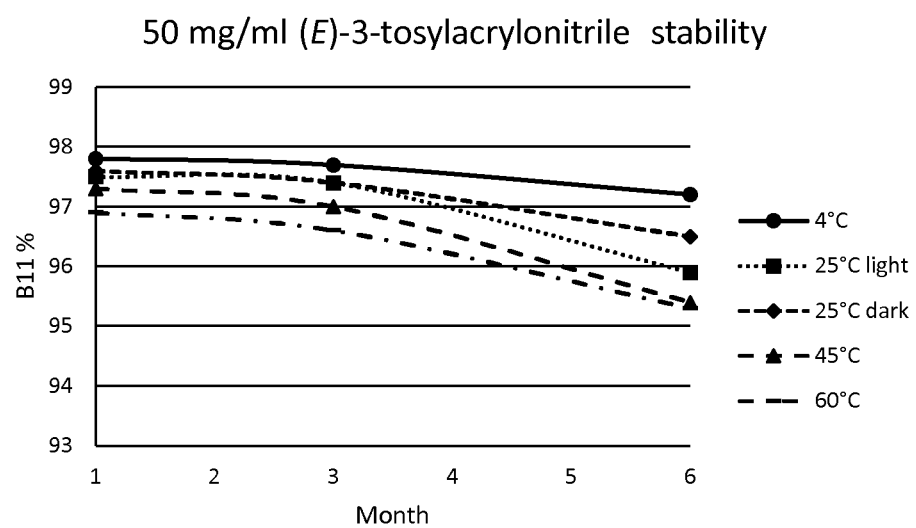
FIG. 3 presents the long-time stability of a solution of 50 mg/ml arylsulfonylpropenenitrile in propylene carbonate.

After the initial tests, a second round of tests were conducted with propylene carbonate. The stability of (E)-3-tosylacrylonitrile in propylene carbonate was tested at 10 mg/ml and 50 mg/ml concentrations and at different temperatures. The effect of light on the stability was also examined (FIGS. 2 and 3).

The degradation of (E)-3-tosylacrylonitrile was slow in propylene carbonate and the final concentration of (E)-3-tosylacrylonitrile was well above 90% in all tested conditions after 6 months. As expected, light and temperature accelerate the degradation of (E)-3-tosylacrylonitrile but generally the stability of (E)-3-tosylacrylonitrile in propylene carbonate was good even in harsh conditions.

The invention claimed is:

1. A stable formulation comprising:
   at least one cyclic ester organic solvent selected from propylene carbonate and ethylene carbonate; and
   a compound of Formula (I)

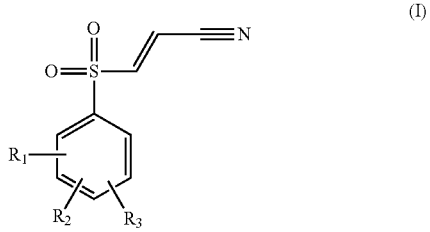

(I)

where $R_1$ represents a methyl group; an ethyl group, a propyl group; a butyl group; a methoxy group; an ethoxy group; a propoxy group; an isopropoxy group; a n-butoxy group; or a tertiary butoxy group;
$R_2$ and $R_3$ represent independently a hydrogen atom; a methyl group; an ethyl group, a propyl group; a butyl group; a methoxy group; an ethoxy group; a propoxy group; an isopropoxy group;
a n-butoxy group; a tertiary butoxy group;
and wherein the formulation comprises at least 80 weight % of said at least one cyclic ester organic solvent and possesses a stability such that at least 90% of the original amount of the compound of Formula (I) remains in the formulation after the formulation is stored for 6 months at 25° C.

2. The formulation according to claim 1, wherein the formulation comprises at least 0.2 weight-% of the compound of Formula (I).

3. The formulation according to claim 1, wherein the formulation comprises water.

4. The formulation according to claim 1, wherein the formulation comprises an additional organic solvent other than the at least one cyclic ester organic solvent.

5. The formulation according to claim 1, wherein the compound of Formula (I) is dissolved in the at least one cyclic ester organic solvent.

6. The formulation according to claim 1, wherein the formulation comprises a residual amount of divalent metal ions.

7. The formulation according to claim 2, wherein the formulation comprises 0.2-20 weight % of the compound of Formula (I).

8. The formulation according to claim 1, wherein the formulation comprises 80-99.9 weight % of the at least one cyclic ester organic solvent.

9. The formulation according to claim 3, wherein the formulation comprises 2-10 weight % of water.

10. The formulation according to claim 4, wherein the additional organic solvent is an alcohol.

11. The formulation according to claim 4, wherein the total amount of organic solvents in the formulation comprises 80-99.9 weight % of the formulation.

12. The formulation according to claim 4, wherein the additional organic solvent is an alcohol, and the total amount of organic solvents in the formulation comprises 90-99.9 weight % of the formulation.

13. The formulation according to claim 6, wherein the residual amount of divalent metal ions in the formulation is 10-100 ppm.

14. The formulation according to claim 2, wherein the formulation comprises 1-7 weight % of the compound of Formula (I).

15. The formulation according to claim 2, wherein the formulation comprises 1-5 weight % of the compound of Formula (I).

16. The formulation according to claim 1, wherein the formulation comprises 90-99.9 weight % of the cyclic ester organic solvent.

17. The formulation according to claim 1, wherein the formulation comprises 95-99.5 weight % of the cyclic ester organic solvent.

18. The formulation according to claim 4, wherein the total amount of organic solvents in the formulation comprises 80-99.9 weight % of the formulation.

19. The formulation according to claim 4, wherein the total amount of organic solvents in the formulation comprises 95-99.5 weight % of the formulation.

20. The formulation according to claim 4, wherein the additional organic solvent is an alcohol, and the total amount of organic solvents in the formulation comprises 95-99.5 weight % of the formulation.

21. The formulation according to claim 6, wherein the residual divalent metal ions in the formulation comprise $Cu^{2+}$ metal ions.

22. The formulation according to claim 6, wherein the residual divalent metal ions in the formulation comprise $Cu^{2+}$ metal ions in an amount ranging from 10-100 ppm.

23. A stable formulation comprising:
    at least one cyclic ester organic solvent selected from propylene carbonate and ethylene carbonate,
    a compound of Formula (I)

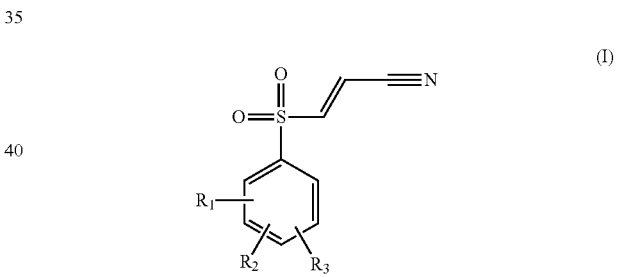

(I)

where $R_1$ represents a methyl group; an ethyl group, a propyl group; a butyl group; a methoxy group; an ethoxy group; a propoxy group; an isopropoxy group; a n-butoxy group; or a tertiary butoxy group;
$R_2$ and $R_3$ represent independently a hydrogen atom; a methyl group; an ethyl group, a propyl group; a butyl group; a methoxy group; an ethoxy group; a propoxy group; an isopropoxy group; a n-butoxy group; or a tertiary butoxy group, and
one or more additives in an amount of up to 5 weight % selected from the group consisting of an emulsifier, a gelling agent, a thickener, a solubilizer, a surfactant, a stabilizing agent, and mixtures thereof,
wherein the formulation comprises at least 80 weight % of said at least one cyclic ester organic solvent and possesses a stability such that at least 90% of the original amount of the compound of Formula (I) remains in the formulation after the formulation is stored for 6 months at 25° C.

* * * * *